United States Patent [19]
Karunanidhi

[11] Patent Number: 6,108,603
[45] Date of Patent: Aug. 22, 2000

[54] NAVIGATION SYSTEM USING POSITION NETWORK FOR MAP MATCHING

[75] Inventor: Upparapalli Karunanidhi, Troy, Mich.

[73] Assignee: Magellan DIS, Inc., Rochester Hills, Mich.

[21] Appl. No.: 09/056,218

[22] Filed: Apr. 7, 1998

[51] Int. Cl.⁷ .............................. G06G 7/78; G01C 21/00
[52] U.S. Cl. ....................... 701/208; 701/210; 701/214; 701/216
[58] Field of Search ..................... 701/201, 202, 701/207, 208, 209, 210, 211, 212, 205, 213, 214, 216, 220, 221; 707/100, 2; 340/988, 990, 995; 345/473; 342/451, 357.01, 457; 73/178 R

[56] References Cited

U.S. PATENT DOCUMENTS

| | | | |
|---|---|---|---|
| 5,046,011 | 9/1991 | Kakihara et al. | 701/209 |
| 5,109,344 | 4/1992 | Kakihara et al. | 701/209 |
| 5,307,278 | 4/1994 | Hermans et al. | 701/217 |
| 5,371,678 | 12/1994 | Nomura | 701/210 |
| 5,465,089 | 11/1995 | Nakatani et al. | 340/995 |
| 5,613,055 | 3/1997 | Shimoura et al. | 701/200 |
| 5,648,901 | 7/1997 | Gudat et al. | 701/23 |
| 5,657,226 | 8/1997 | Shin et al. | 701/23 |
| 5,684,696 | 11/1997 | Rao et al. | 701/25 |
| 5,774,824 | 6/1998 | Streit et al. | 701/307 |
| 5,978,732 | 11/1999 | Kakitani et al. | 701/211 |
| 5,982,301 | 11/1999 | Ohta et al. | 701/210 |

FOREIGN PATENT DOCUMENTS 0339639 of 1989 European Pat. Off. .

*Primary Examiner*—Jacques H. Louis-Jacques
*Attorney, Agent, or Firm*—Howard & Howard

[57] ABSTRACT

A navigation system includes a positions network having a plurality of nodes, each corresponding to a segment in a road segments network. A branch is propagated from each node in the positions network based upon a dead reckon path of position vectors. Each of the branches in the positions network represents a potential current position of the vehicle. The branches in the positions network are compared to the segment in the segments network to determine a current position of the vehicle.

16 Claims, 2 Drawing Sheets

NAVIGATION SYSTEM USING POSITION NETWORK FOR MAP MATCHING

BACKGROUND OF THE INVENTION

The present invention relates to navigation systems and more particularly to a navigation system having an improved system and method for determining current position utilizing map matching.

Current navigation systems include one or more sensors for propagating the position of a vehicle. A sensor for determining displacement, such as a wheel speed sensor, is used in conjunction with a sensor for determining heading, such as a gyro, to generate a series of position vectors. The position vectors generally include a displacement and a heading. The series of position vectors forms a "dead reckon" path of the vehicle.

Generally, by periodically determining the position vectors of the vehicle, the navigation system can dead reckon the current position of the vehicle by utilizing "map matching". The navigation system includes a database of road segments, including segment length and intersection points. After receiving each new position vector, the navigation system compares the shape of the dead reckon path to the shape of the road segments in the database. The navigation system determines the current position of the vehicle by comparing the shape of the dead reckon path with the road segments in the database. After each new position vector is received, the navigation system compares the shape of the dead reckon path to all the potential road segments on which the current vehicle may be.

Near a node, or intersection, the navigation system may have to compare the shape of the dead reckon path to numerous road segments after each new position vector is received. This reduces the efficiency and speed with which the navigation system can rule out road segments and determine the current position of the vehicle relative to the road segments in the database.

SUMMARY OF THE INVENTION

A navigation system of the present invention determines the current position of the vehicle more quickly and efficiently by utilizing a positions network of potential current positions.

The navigation system of the present invention includes sensors for generating a dead reckon path comprising a series of position vectors each having a heading and a displacement. A database of roads to be traveled by the vehicle includes a segment network of road segments intersecting at nodes. A positions network is generated having a plurality of nodes each corresponding to a node in the segments network. A branch is propagated from each node in the positions network based upon the position vectors. After each position vector is received, each branch of the positions network is compared to a corresponding road segment in the segments network. Preferably, a cumulative total of the angular deviations (weighted by displacement) between each branch in the positions network is compared with the corresponding segment in the segments network.

The navigation system determines that the current position of the vehicle is where the branch in the position network has the lowest cumulative angular deviation from its corresponding segment in the segments network. If the cumulative angular deviation for a branch in the positions network exceeds a predetermined threshold, that branch is "pruned" and no longer propagated or compared to the segments network.

Since a plurality of possible position branches are generated in the positions network, each corresponding to a segment in the segments network and since the angular deviation is accumulated and evaluated after each position vector is received, the current position of the vehicle is more efficiently and quickly calculated. The navigation system can more quickly determine the current position of the vehicle because it has been propagating a plurality of positions branches and has been comparing each of them to the segments network after receiving each position vector. At or near a node in the segments network, the navigation system does not have to compare the entire shape of the dead reckon path to each of the potential paths in the road segment network. As a result, the navigation system can more quickly determine the current position of the vehicle and more quickly prune branches from the positions network.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
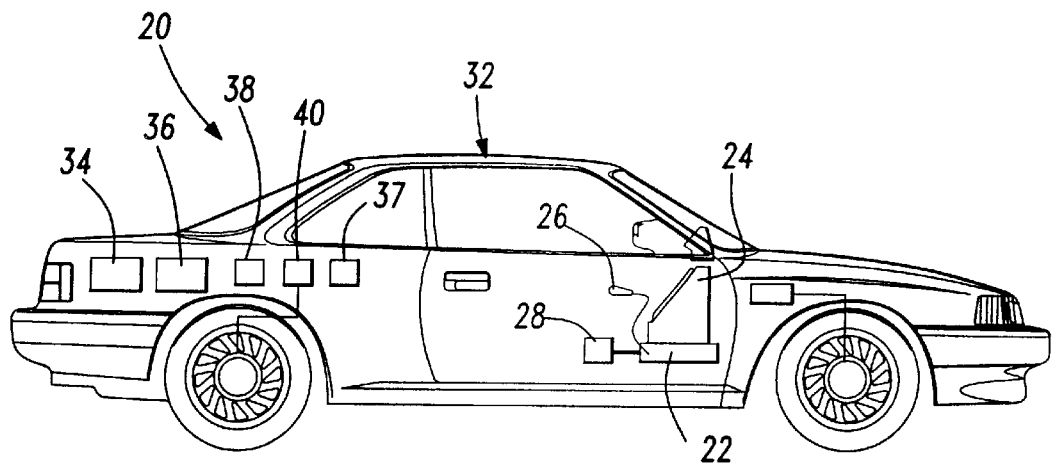
FIG. 1 is a schematic of the navigation system of the present invention.

The navigation system 20 of the present invention is shown schematically in FIG. 1. The navigation system 20 includes a CPU 22 connected to a display 24, such as a high resolution LCD or flat panel display. The CPU 22 is also connected to an input device 26 such as a mouse, keyboard, key pad or remote device. Alternatively, the display 24 can be a touch screen display. The navigation system 20 further includes a storage device 28, such as a hard drive 28 or CD ROM, connected to the CPU 22. The storage device 28 contains a database including a map of all the roads in the area to be traveled by the vehicle 32 and may contain the software for the CPU 22, including the graphical user interface, route guidance, operating system, position-determining software, etc.

The navigation system 30 preferably includes position and motion determining devices, such as a GPS receiver 34, a gyroscope 36, a compass 38, a wheel speed sensor 40 and an orthogonal multiple axis accelerometer 41 all connected to the CPU 22 (connections not shown for simplicity). Such position and motion determining devices are well known and are commercially available.

The navigation system 20 determines the position of the vehicle 32 relative to the database of roads utilizing the position and motion determining devices. The driver selects a destination relative to the database of roads utilizing the user input device 26 and the display 24. The navigation system 20 then displays turn-by-turn instructions to the driver to guide the driver to the desired destination from the present position.

Figure 2:
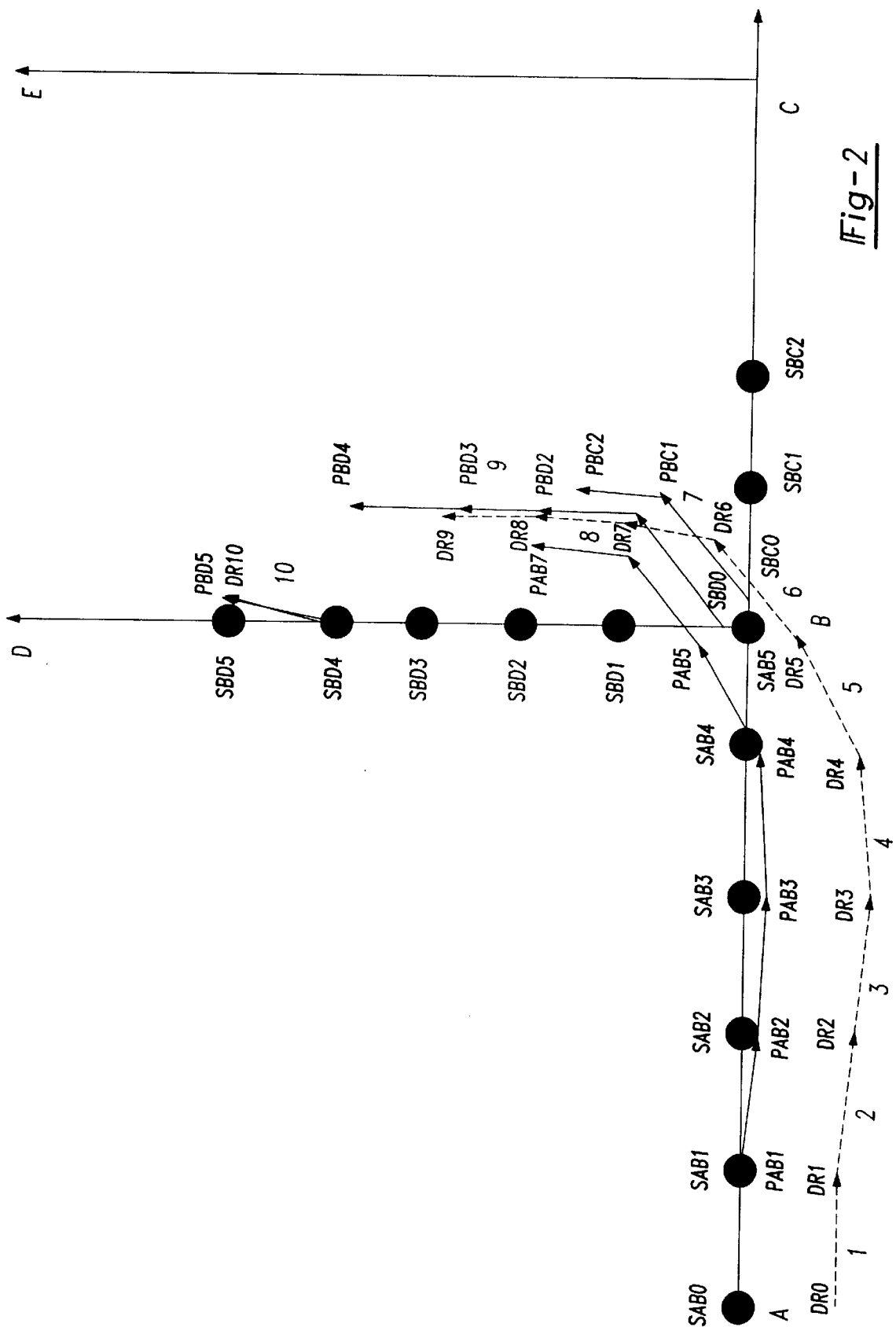
FIG. 2 illustrates the positions and segments networks of the navigation system of FIG. 1.

FIG. 2 illustrates how the navigation system 20 determines the present position of the vehicle 32. The database includes a plurality of road segments intersecting at segment nodes. For example, illustrated in FIG. 2 are segment nodes A, B, C, D and E and road segments AB, BC, BD and CE. The navigation system 20 generates a dead reckon path 66 comprising a series of position vectors DR1 to DR11. Each of the position vectors has a displacement and heading.

A position network is represented as P(left node)(right node)i, where left and right are segment nodes from which this position network is derived and i is the ith position. For example, PAB1 is the first position derived from the AB segment.

A segment network is represented as S(left node)(right node)i, where left and right are segment nodes from which this segment network is derived and i is the ith position. For example, SAB1 is the position on segment AB after position vector 1.

The positions network is a network of all possible positions that the vehicle might take in traversing the dead reckon path 66 referenced from the possible segments of the segments network. The positions network is derived from the segments network. Each node of the positions network has a corresponding node in the segments network. The positions network is generally a tree, the root of which will be the last "snapped" position, i.e. where the navigation system 20 determines the present position of the vehicle. Both the segments network and the positions network have identical nodes; therefore, it is simple to represent the positions network as a list of positions from each node of the segments network.

The propagation and pruning of the positions network will be described with reference to FIG. 2 and Table 1. The initial position of the vehicle 32 as determined by the sensors is represented by point I. This initial position is projected onto the surrounding segments, which in this case is onto segment AB for position SAB0. When position vector DR1 is received, the positions network is derived from the possible position from the previous iteration, which can only be PAB1. SAB1 is the position on the segment network. At this point in time, segment AB is the only possible segment. As position vectors DR2, DR3 and DR4 are received, the position network is expanded with PAB2, PAB3 and PAB4, respectively, each having a heading and displacement equal to the associated position vectors. Again, segment AB is the only possible segment.

| Vectors | Dead Reckoned Position | Positions Network | Segment Network | Possible Segments/Remarks |
| --- | --- | --- | --- | --- |
| Initial Position | Initial Position I | NULL | Initial Position Projected on Segment AB position SAB0 | AB possible segment. |
| Vector 1 | DR1 | PAB1 | SAB1 | |
| vector 2 | DR2 | PAB2 | SAB2 | |
| Vector 3 | DR3 | PAB3 | SAB3 | |
| Vector 4 | DR4 | PAB4 | SAB4 | |
| Vector 5 | DR5 | PAB5 | SAB5, SBC0 and SBD0 | After expansion at node B. SAB5 position of node B with just distance being added. Possible segments are AB, BC, BD |

-continued

| Vectors | Dead Reckoned Position | Positions Network | Segment Network | Possible Segments/Remarks |
| --- | --- | --- | --- | --- |
| Vector 6 | DR6 | PAB6, PBD1, PBC1 | SAB5, SBC1 and SBD1 | positions network has two new positions, after doing dead reckoning with vector 6 from SBC1 and SBD1. Beginning of a turn noticed. |
| Vector 7 | DR7 | PAB7, PBD2, PBC2 | SAB5, SBC2 and SBD2 | Network Evaluating decides AB & BC as dead. Positions network and Segment network will stop growth in this direction. |
| Vector 8 | DR8 | PBD3 | SBD3 | Turn Completed |
| Vector 9 | DR9 | PBD4 | SBD4 | Network Evaluating decides to snap at this position. So Position Network and Segment Network will be pruned. Only BD is the possible segment. |
| Vector 10 | DR10 | PBD5 | SBD5 | Segment Network and Positions network will start growing again from the reference position of SBD5. |

When position vector DR5 is received, the vehicle 32 has traveled enough distance to have crossed the segment AB. As a result, node B is expanded and there are two new segments, BC and BD, and two corresponding new positions SBC0 and SBD0. The positions SBC0 and SBD0 are equally spaced from segment node B to the extent the displacement of position vector DR5 exceeded the distance between SAB4 and segment node B.

Possible segment AB is still retained, although the position is anchored at node B, the distance will be added to this segment. When vector DR6 is received, the positions network also has two new positions starting from SBC0 and SBD0 in addition to the AB branch. Branch PBD0 is expanded to PBD1–PBD5, based upon receiving position vectors DRC6–DR10. Branch PBC0–PBC3 is propagated based upon receiving position vectors DR6–DR8.

The positions network is evaluated with respect to the segments network by comparing the shape of the positions network with the segments network. The path for each positions network branch is compared with the corresponding segment in the segments network. Upon receiving each position vector, the angular variation between the segment and the positions network and the segment in the segments network is derived. In the case of turns, comparison is made from the turn anchor vector onwards. Segments that match with the positions network shape have a higher PN figure of merit. The angular variation is given by:

$$\text{Angular variation} = \Sigma[(\text{positions network heading} - \text{Segments network heading}) \times \text{distance component of vector}]/\text{Length of the segment}.$$

A small value indicates a good match.

When position vector DR9 is received, there is a rapid decrease in the figure of merit for the positions network PBC and PAB. These networks and their corresponding segments networks SAB and SBC are "pruned" and no longer propagated. The navigation system 20 snaps to SBD5 and BD is the only possible segment. Propagation of vehicle 32 position then continues according to this method from SBD5.

Figure 3:
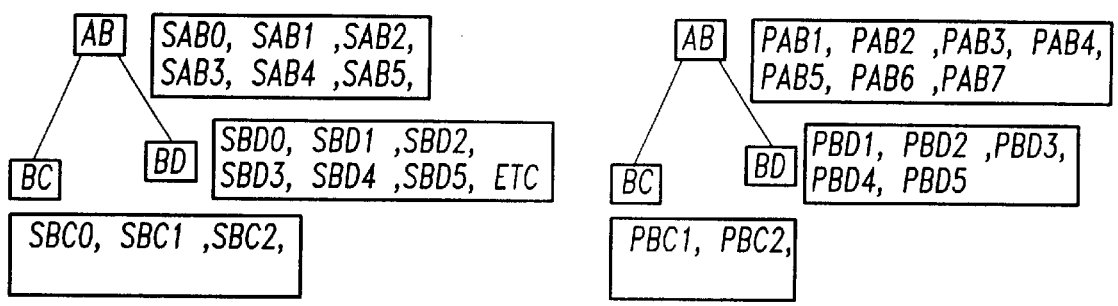
FIG. 3 illustrates the positions and segments networks of FIG. 2 as tree data structures.

FIG. 3 illustrates the positions and segments networks as trees. The root of the tree is the last snapped position. The segments and positions networks have identical nodes.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A navigation system comprising:
    a segments network having a plurality of road segments connected at nodes; and
    a positions network having a plurality of nodes, each corresponding to a different one of said road segments in the segments network, the positions network further including a branch propagated from each node in the positions network, said branches propagated simultaneously based upon a displacement and a heading.

2. A navigation system of claim 1, further including means for comparing the positions network to the segments network and pruning the positions network based upon the comparison.

3. A navigation system of claim 2, wherein the means for comparing compares an angular variation between a positions network branch and a segments network segment.

4. A method for map matching in a navigation system including the steps of:
    a. providing a segments network having a plurality of nodes connecting a plurality of road segments;
    b. creating a positions network having a plurality of nodes, each corresponding to a road segment in said segments network;
    c. propagating a branch from each node in said positions network based upon a series of headings and displacements;
    d. comparing each said branch in said positions network to a road segment in the segments network; and
    e. determining the current position on one of the road segments based upon one of the branches and based upon the comparison in said step d.

5. The method of claim 4 further including a step of pruning said positions network based upon said comparison in said step (d).

6. The method of claim 4 further including a step of determining a current position as one of said branches in said segments network.

7. The method of claim 4 further including a step of accumulating an angular deviation between each said branch of said positions network and its associated branch in the segments network.

8. The method of claim 7 further including a step of accumulating said angular deviation after receiving each said heading and displacement signal.

9. The method of claim 4 wherein said branches are propagated simultaneously.

10. A navigation system comprising:
    a CPU receiving a heading signal and a displacement signal, said CPU generating a series of position vectors based upon said heading signal and said displacement signal;
    a segments network comprising a plurality of road segments and a plurality of nodes each associated with at least one of said plurality of road segments;
    a positions network of possible current positions including a plurality of position nodes, each associated with different one of said road segments in said segments network, said CPU propagating a branch from each of said positions nodes based upon said heading signal and said displacement signal.

11. A navigation system of claim 10, wherein said CPU determines a current position based upon one of said plurality of branches in said positions network.

12. A navigation system of claim 11, wherein said CPU prunes said positions network based upon a comparison of said positions network and said segments network.

13. The navigation system of claim 12 wherein said CPU compares said positions network to said segments network to determine a current position.

14. The navigation system of claim 13 wherein said CPU compares each said branch of said positions network to its associated branch in said segments network.

15. The navigation system of claim 14 wherein said CPU accumulates an angular deviation between each said branch of said positions network and its associated branch in the segments network.

16. The navigation system of claim 15 wherein said CPU accumulates said angular deviation after receiving each said heading and displacement signal.

* * * * *